United States Patent
Kunisch

(10) Patent No.: US 6,934,382 B1
(45) Date of Patent: Aug. 23, 2005

(54) METHOD FOR RECOGNIZING AN OFF-HOOK CONDITION ON A SINGLE SUBSCRIBER LINE WITH TWO TERMINAL DEVICES

(75) Inventor: Paul Kunisch, Puchheim (DE)

(73) Assignee: Siemens Aktiengesellschaft, Munich (DE)

( * ) Notice: Subject to any disclaimer, the term of this patent is extended or adjusted under 35 U.S.C. 154(b) by 781 days.

(21) Appl. No.: 09/670,648

(22) Filed: Sep. 27, 2000

(30) Foreign Application Priority Data

Sep. 28, 1999 (DE) .......................................... 199 46 442

(51) Int. Cl.$^7$ ............................ H04M 1/00; H04M 3/00
(52) U.S. Cl. ...................................... 379/377; 379/381
(58) Field of Search .................. 379/377, 29.03–29.04, 379/207.7, 30, 381, 393

(56) References Cited

U.S. PATENT DOCUMENTS

| 4,712,233 A | | 12/1987 | Kuo | |
|---|---|---|---|---|
| 5,398,277 A | * | 3/1995 | Martin et al. | 379/39 |
| 5,422,939 A | * | 6/1995 | Kramer et al. | 379/106.08 |
| 5,506,891 A | * | 4/1996 | Brown | 379/100.06 |
| 6,240,177 B1 | * | 5/2001 | Guntzburger et al. | 379/387.01 |
| 6,426,961 B1 | * | 7/2002 | Nimmagadda | 370/493 |

FOREIGN PATENT DOCUMENTS

DE 199 42 691 3/2001

* cited by examiner

*Primary Examiner*—Curtis Kuntz
*Assistant Examiner*—Alexander Jamal
(74) *Attorney, Agent, or Firm*—Neifeld IP Law, PC

(57) ABSTRACT

The invention is directed to a method for recognizing, in a system having a first terminal device and a second terminal device connected to a two-wire subscriber line, an off-hook condition of the second terminal device (2; 3) at the two-wire subscriber line (4) in a switching center (5) or the like, in which the off-hook condition of a first terminal device (3; 2) working in a different frequency band than the second terminal device at the same two-wire subscriber line is recognized by acquiring a loop d.c. (i) and comparing it to a threshold. For reducing the consumable power to be made available in the switching center (5), the invention provides that the loop d.c. (i) is compared to a second threshold that is higher than the first threshold by the minimally required current level in the operation of the first terminal device (3; 2). All off-hook conditions can thus be dependably recognized in the fundamentally same way without providing additional devices and therefore having to make additional consumable power available.

7 Claims, 1 Drawing Sheet

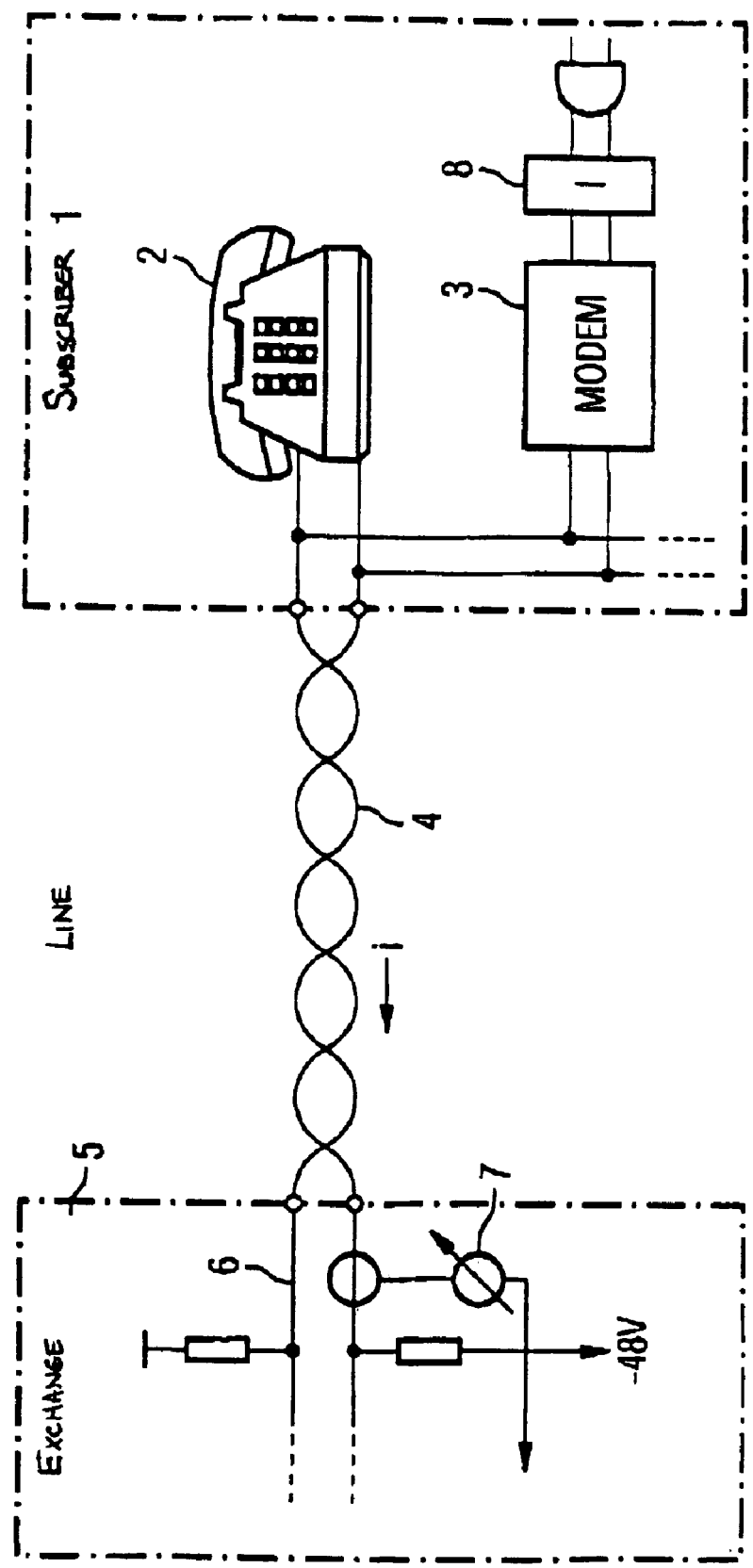

METHOD FOR RECOGNIZING AN OFF-HOOK CONDITION ON A SINGLE SUBSCRIBER LINE WITH TWO TERMINAL DEVICES

BACKGROUND OF THE INVENTION

1. Field of the Invention The invention is directed to a method for recognizing an off-hook condition of a terminal device at a two-wire subscriber line in a switching center or the like, in which the off-hook condition of a first terminal device working in a different frequency band at the same two-wire subscriber line is recognized by acquiring a loop d.c. current and the comparison thereof to a threshold (event threshold).

2. Description of the Related Art

It is necessary to reliably and unequivocally acquire the off-hook condition of subscriber-side terminal devices in a switching center at which the subscriber lines converge. For two-wire subscriber lines, a subscriber circuit is respectively allocated in the switching center that has an indicator allocated to it with which the off-hook condition of the subscriber-side terminal device is recognized.

This takes place by acquiring the loop current for analog terminal devices such as traditional telephone sets and fax devices. In the on-hook condition, i.e., when the handset is placed on the cradle switch, the terminating impedance of the terminal device is infinitely high (open loop), and thus no current flows via the two-wire line to the exchange circuit at which a voltage is applied.

As soon as the handset is taken from the cradle switch, the terminating impedance is comparatively low (approximately 300 Ω, which causes a loop d.c. current to flow via the two-wire line. This is recognized by an exchange circuit on the basis of an indicator. When this current exceeds a threshold, an off-hook condition is presumed, and all following circuits are activated, particularly the circuit arrangement that triggers the dial event and the connection event, etc.

The same procedure is also fundamentally possible when the subscriber-side terminal device is a digital terminal device that is connected to the two-wire subscriber line via a modem. It has become increasingly desirable to connect not only a single terminal device to a two-wire subscriber line but at least one further terminal device, the pair usually being an analog telephone and a digital terminal device. When the previously standard system of a two-party line is used, it is not possible to simultaneously operate of both terminal devices. However, it is desirable to also be able to transmit data in addition to a traditional telephone call, which is referred to as a "data-over-voice" application. Such applications are especially desirable in ADSL networks.

To achieve this, it was previously necessary to couple the digital terminal device via a POTS splitter and, further, to allocate a filter circuit capable of recognizing and coupling out the high-frequency part to the subscriber circuit at the exchange side. This made use of the fact that analog voice connections occur in a frequency range up to approximately 16 KHz, whereas digital data connections occur in a frequency range above 30 KHz.

Since the recognition of the off-hook condition must be dependable, it is necessary in this application to allocate not only an indicator to each subscriber circuit in the switching center but also a filter or, respectively, some other recognition circuit with respect to the transmission of digital data.

These two recognition circuits, indicator and filter, must be constantly in operation and therefore require the constant supply of electrical power. Furthermore, the resulting heat produced requires additional measures such as aerators or similar mechanisms in order to eliminate this heat. The power consumption, which is referred to as consumed power, lies in the range of less than 1W per subscriber, but must be expended for all subscribers. Since only some of the subscribers connected to the switching center are activated, i.e., are operated in the off-hook condition, a power consumption of some number of watts arises only for such off-hook subscribers.

The power required for a plurality of subscribers connected in the switching center is therefore not negligible. This is reflected in the capital and operating costs and, thus, in the connection charges that every subscriber must pay.

SUMMARY OF THE INVENTION

It is therefore an object of the invention to specify a method for recognizing the off-hook condition of further terminal devices at the same two-wire subscriber line of a first terminal device that allows a reduction in the consumable power that must be provided, in which a loop d.c. of a two-wire subscriber line with a first terminal device working in a first frequency band is acquired and compared to the acquired loop d.c. to a threshold, thus recognizing an off-hook condition of the first terminal device.

This object is achieved in that the loop d.c. is compared to a second threshold that is higher than the first threshold by the current level minimally required given operation of the first terminal devices. One of the terminal devices is an analog terminal device and the other terminal device is a digital or data terminal device. One preferred embodiment sets the first threshold at approximately 10 mA. A d.c. resistance of the digital or data terminal device may be determined such that is corresponds to that of an analog terminal device at least at a beginning of an off-hook condition. Thus d.c. resistance may be preferably set at 300 Ω. The inventive method may further comprise the step of lowering the d.c. current of the digital or data terminal device after recognition of the off-hook condition at the digital or data terminal device and a beginning of a data transmission, to approximately 5 mA by raising the d.c. resistance of the digital or data terminal device with an active current source.

The invention proceeds on the basis that the recognition of the off-hook condition of a digital terminal device is also fundamentally possible via the acquisition of the loop current and that, further, a quiescent condition occurs in which only a slight loop d.c. flows once an off-hook condition has been detected. When an off-hook condition has been acquired on the one hand and a further off-hook condition is acquired, it is possible on the basis of the following circuit arrangements in the exchange to determine the type of terminal equipment that caused the respective off-hook condition.

Accordingly, only a single indicator that constantly operates is required in the exchange for each two-wire subscriber line, i.e., for each subscriber circuit. The power consumption is thus low with the consumable power only amounting to a few mW. The additional requirement to provide consumable power for each type of terminal equipment is eliminated; on the contrary, only a specific consumable power need be made available per two-wire line regardless of the number of terminal devices connected at the subscribe side.

BRIEF DESCRIPTION OF THE DRAWINGS

The invention is explained in greater detail on the basis of the exemplary embodiments schematically shown in the Figure, which is a schematic diagram illustrating the inventive method.

DESCRIPTION OF THE PREFERRED EMBODIMENTS

First, the Figure shows a subscriber 1 that is connected via a two-wire subscriber line 4—shown as a stranded line—to an appertaining subscriber circuit 6 in a switching center/ exchange 5 or the like. Both an analog terminal device 2 such as a telephone or telefax device as well as a digital terminal device 3 for data transmission, exemplified by a modem, are directly connected to the two-wire subscriber line 4 at the side of the subscriber 1. The subscriber circuit 6 exhibits a standard structure and, in particular, comprises an indicator 7 that is capable of detecting the amount of current i flowing over the two-wire subscriber line 4.

The subscriber 1 can be either the calling or the called subscriber. There are therefore two different line conditions:
a) on the part of the calling subscriber:
a1) both the analog terminal device 2 as well as the digital terminal device 3 (modem) are in the quiescent condition (loop current i=0);
a2) the analog terminal device 2 is picked up (off-hook) and a dialed connection is setup or, respectively, is placed down (on-hook), which releases the dialed connection, while the digital terminal device 3 is in the quiescent condition;
a3) the off-hook condition is triggered at the digital terminal device 3, for example by a pilot tone, a start protocol or by mechanical actuation of a switch or the like, as a result of which a data connection is setup, where a data connection is also ended in the same way, while the analog terminal device 2 remains in the quiescent condition;
a4) the connection (telephone connection) relating to the analog terminal device 2 remains and the off-hook condition is additionally triggered at the digital terminal device 3 and the data connection is setup or, respectively, such a data connection is in turn ended;
a5) for an existing data connection from the digital terminal device 3, the off-hook condition is triggered at the analog terminal device 2 (for instance by lifting up the handset from the cradle switch) and a dialed connection is set up or, respectively, is in turn released by hanging up;
b) at the side of the called subscriber:
b1) both the analog terminal device 2 as well as the digital terminal device 3 (modem) are in the quiescent condition (loop current i=0);
b2) the analog terminal device 2 is called and the call is answered at this device (off-hook), while the digital terminal device 3 continues to remain in the quiescent condition;
b3) the digital terminal device 3 (modem) is activated by a pilot tone (start protocol) while the analog terminal device remains in the quiescent condition;
b4) for an existing data connection to the digital terminal device 3, the analog terminal device 2 is called and its off-hook condition is triggered by answering the call;
b5) for an existing voice connection (telephone connection) to the analog terminal device 2, the digital terminal device 3 is activated by a pilot tone (start protocol).

Except for the line conditions a1 and b1 where no loop current flows (i=0), the current that can be acquired in terms of its amount by the indicator 7 flows for the other line conditions. The indicator 7 of the subscriber circuit 6 in the exchange is always operating in order to identify whether a DC current differing from zero flows over the two-wire subscriber line 4 and whether this exceeds a specific event threshold or a threshold. When this loop DC exceeds a threshold that currently lies at approximately 10 mA for recognition of the off-hook condition at analog terminal devices 2, one (at least) of the two terminal devices is in the off-hook condition or activated, since a loop DC that can be acquired by the indicator 7, and exceeds the event threshold, flows.

This is also fundamentally possible given the digital terminal device 3. When the DC resistance of the modem of the digital terminal device 3 is brought at least initially to a value that corresponds to the DC resistance of the analog terminal device 2, currently approximately 300 Ω, then the off-hook condition that the digital terminal device 3 works in, operates in the same way via a loop DC i of the same order of magnitude. Following the setup of the data connection, it is expedient to reduce the loop DC flowing during the data connection, for instance by raising the DC resistance with the assistance of an active current source or sink 8 to approximately 5 mA. As a result of the change of the loop DC i when the handset of the analog terminal device 2 is picked up given an existing data connection, this new off-hook condition can be acquired as a result.

This is conversely possible given an existing analog telephone connection and subsequently triggered off-hook condition at the digital terminal device 3. When the further off-hook condition has been initially recognized in the exchange 5, all further circuit measures necessary at the exchange can be triggered for the setup of the connection, the transmission of dial tones, interpretation of dialed pulses, etc.

The same thing fundamentally occurs when the subscriber 1 is called at his analog terminal device 2, unless his digital terminal device 3 is activated.

In the simplest embodiment, it is not possible without further effort to call analog terminal devices to give an existing data connection between digital terminal devices 3, since a call disconnect already occurs given a few mA, and the threshold may not be arbitrarily raised. Moreover, the application of the call to the digital terminal device 3 at the low-impedance loop closure of approximately 300 Ω that has been set forth is also not possible independently of the problem triggered due to the call disconnect, since an impedance of at least 1400 Ω must be present during the call for performance reasons.

This problem can be overcome in that said active current limitation in the digital terminal device 3 is implemented with an active current sink at approximately 5 mA. As a result, a dependable call disconnect occurs due to high current change for an off-hook (answering) at the analog terminal device 2 in the call condition (a threshold of approximately 10 mA), where this current sink in the digital terminal device 3 represents an extremely high impedance for the ringing signal (to the analog terminal device 2), and as a result, the ringing signal to the analog terminal device 2 is not noticeably burdened.

The inventive procedure thus makes it possible to reliably recognize all line conditions, namely with a single indicator 7 for indicating the loop DC in the subscriber circuit 6 of the exchange 5 that has an essentially traditional structure and must at most be designed for recognizing two different thresholds. Thus, only a small amount of consumable power needs to be made available in the exchange 5 for all subscriber circuits.

The above-described method is illustrative of the principles of the present invention. Numerous modifications and adaptations of it will be readily apparent to those skilled in this art without departing from the spirit and scope of the present invention.

What is claimed is:
1. A method in a communications system having a first terminal device and a second terminal device, said method recognizing an off-hook condition of said second terminal device at a two-wire subscriber line in a switching center, comprising the steps of:

acquiring a loop d.c. of a two-wire subscriber line with a first terminal device working in a first frequency band and comparing said acquired loop d.c. to a first threshold, thus recognizing an off-hook condition of said first terminal device; and comparing said loop d.c. to a second threshold that is higher than said first threshold by a minimally required current level in operating said first terminal device.

2. A method according to claim 1, wherein one of said first terminal device and said second terminal device is an analog terminal device and the other terminal device is a digital or data terminal device.

3. A method according to claim 1, wherein said first threshold is approximately 10 mA.

4. A method according to claim 2, wherein a d.c. resistance of said digital or data terminal device is determined such that is corresponds to that of an analog terminal device at least at a beginning of an off-hook condition.

5. A method according to claim 4, wherein said d.c. resistance is 300 Ω.

6. A method according to claim 4, further comprising the step of:

lowering said d.c. current of said digital or data terminal device after recognition of said off-hook condition at said digital or data terminal device and a beginning of a data transmission, to approximately 5 mA with an active current source.

7. A communications method, comprising:

measuring in a switching center a loop direct current of a two-wire subscriber line electrically connected to a first terminal device and to a second terminal device;

comparing said loop direct current to a first threshold current, wherein said first threshold current is higher than said loop direct current measured when said first terminal device and said second terminal device are both on-hook;

recognizing an off-hook condition of said first terminal device;

comparing said loop direct current to a second threshold current, wherein said second threshold current is higher than said first threshold current by a minimally required operating current level of said first terminal device; and recognizing an off-hook condition wherein both first terminal device and said second terminal device are off-hook at the same time.

\* \* \* \* \*